(12) United States Patent
Mori

(10) Patent No.: US 10,288,161 B2
(45) Date of Patent: May 14, 2019

(54) WASHER AND DIFFERENTIAL DEVICE

(71) Applicant: MUSASHI SEIMITSU INDUSTRY CO., LTD., Toyohashi-Shi, Aichi (JP)

(72) Inventor: Hiroyuki Mori, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 15/703,464

(22) Filed: Sep. 13, 2017

(65) Prior Publication Data

US 2018/0087642 A1 Mar. 29, 2018

(30) Foreign Application Priority Data

Sep. 27, 2016 (JP) .................. 2016-188542

(51) Int. Cl.
*F16H 48/38* (2012.01)
*F16H 48/08* (2006.01)

(52) U.S. Cl.
CPC .............. *F16H 48/38* (2013.01); *F16H 48/08* (2013.01); *F16H 2048/387* (2013.01)

(58) Field of Classification Search
CPC ..... F16H 48/38; F16H 48/08; F16H 2048/387
See application file for complete search history.

(56) References Cited

U.S. PATENT DOCUMENTS

| | | | | |
|---|---|---|---|---|
| 8,382,632 B2* | 2/2013 | Segawa | ................... | B23P 15/14 29/893.1 |
| 2004/0134307 A1* | 7/2004 | Pascoe | ................... | F16H 48/08 74/650 |
| 2004/0149062 A1* | 8/2004 | Atkinson | ................ | F16H 48/08 74/424 |
| 2005/0020397 A1* | 1/2005 | Santelli | ................... | F16H 48/08 475/230 |
| 2006/0240934 A1* | 10/2006 | Cradit | ..................... | F16H 48/08 475/230 |
| 2009/0215574 A1* | 8/2009 | Weber | ..................... | F16H 48/08 475/230 |

FOREIGN PATENT DOCUMENTS

| JP | 2011-085232 A | 4/2011 |
|---|---|---|
| JP | 4857465 B2 | 1/2012 |
| JP | 5198970 B2 | 5/2013 |

* cited by examiner

*Primary Examiner* — Jacob S. Scott
*Assistant Examiner* — Tinh Dang
(74) *Attorney, Agent, or Firm* — Carrier Blackman & Associates, P.C.; Joseph P. Carrier; Fulchand P. Shende

(57) ABSTRACT

A washer includes at least one differential gear back face part covering a back face of one differential gear, an output gear back face part covering a back face of one output gear, and at least one linking part connecting between the output gear back face part and the differential gear back face part, an abutment part being formed on an inner face of the differential gear back face part, the abutment part abutting against the back face of the differential gear via a flat face.

8 Claims, 6 Drawing Sheets

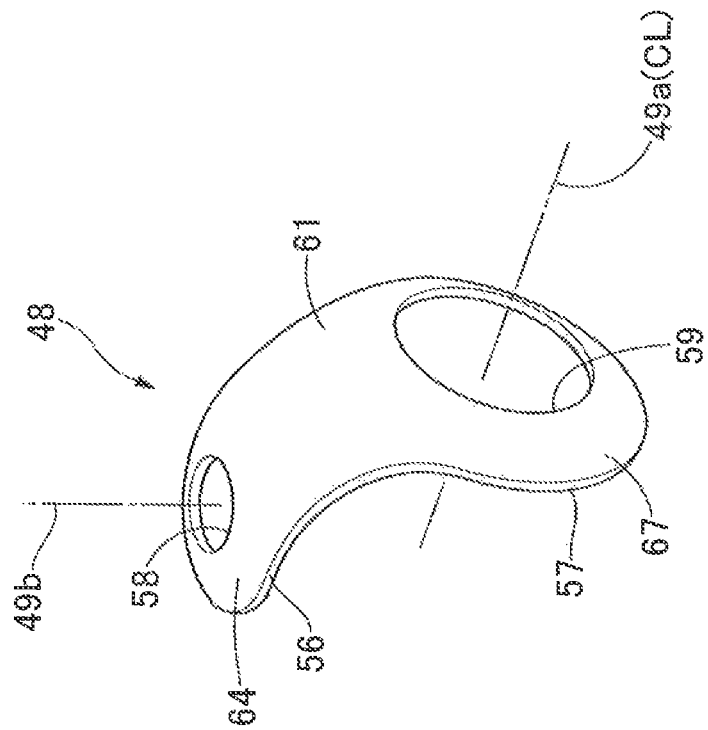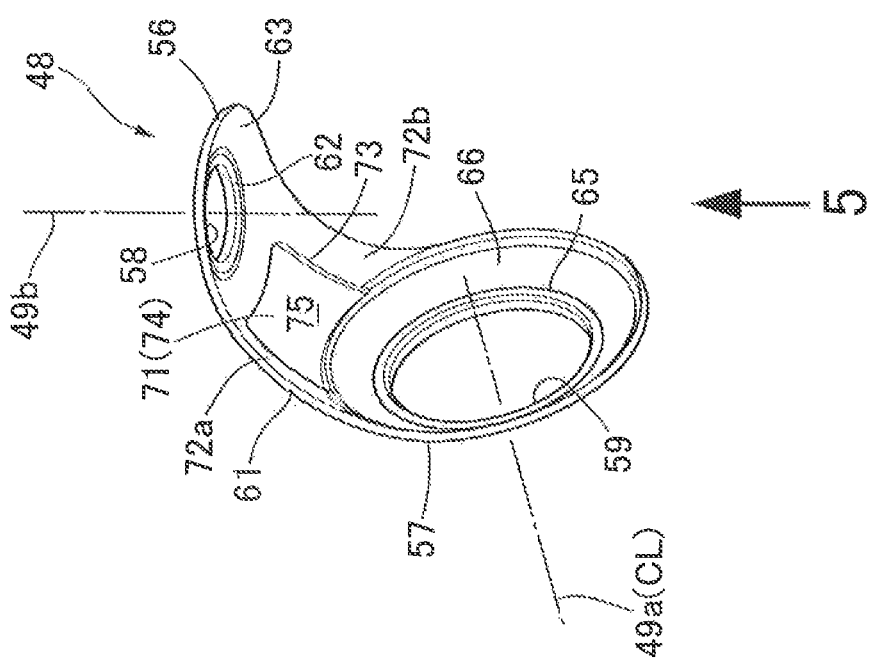

WASHER AND DIFFERENTIAL DEVICE

BACKGROUND OF THE INVENTION

Field of the Invention

The present invention relates to a differential device that is mounted mainly on a vehicle and to a washer that can be used in a differential device, a transmission device and the like.

Description of the Related Art

In a differential device, a washer in which one pinion gear side and one side gear side are integrally formed has already been disclosed (e.g. Japanese Patent No. 5198970). Since a conventional washer has a small contact area with a side gear, there is a possibility that it will not be able to fully receive the load of the side gear. In order to solve this problem, a technique of covering the side gear side with a washer by using the technique of a washer having a spectacles shape, as disclosed in Japanese Patent No. 4857465, could be considered.

However, with a combination of these techniques, there is a possibility that a pinion gear back face part of the washer covering a back face of the pinion gear (differential gear) will be displaced due to rotational power in a rotational direction (ring gear rotational direction) of the side gear (output gear).

SUMMARY OF THE INVENTION

It is an object of the present invention to provide a washer that can suppress effectively displacement of a pinion gear back face part (differential gear back face part) of a washer due to rotational power in a rotational direction of a side gear, and to provide a differential device equipped with the washer.

In order to achieve the object, a washer according to one embodiment of the present invention comprises at least one differential gear back face part covering a back face of one differential gear, an output gear back face part covering a back face of one output gear, and at least one linking part connecting between the output gear back face part and the differential gear back face part, an abutment part being formed on an inner face of the differential gear back face part, the abutment part abutting against the back face of the differential gear via a flat face.

In order to achieve the object, a differential device according to one embodiment of the present invention comprises an input member, a plurality of differential gears including a differential gear flat area and a differential gear curved area on a back face side, the differential gears being housed within the input member, the differential gear curved area extending over an outer periphery of the differential gear flat area, a pair of output gears including an output gear flat area and an output gear curved area on a back face side, the output gears being housed within the input member and meshing with the plurality of differential gears, the output gear curved area extending over an outer periphery of the output gear flat area, and a plurality of the washers, described above, housed within the input member.

In accordance with the present invention, it is possible to suppress displacement of the position of the differential gear back face part of the washer due to rotational power in the rotational direction of the output gear.

The above and other objects, characteristics and advantages of the present invention will be clear from detailed descriptions of the preferred embodiments which will be provided below while referring to the attached drawings.

BRIEF DESCRIPTION OF THE DRAWINGS

FIGS. 3A and 3B are enlarged perspective views of a washer related to a first embodiment.

DESCRIPTION OF THE PREFERRED EMBODIMENTS

Embodiments of the present invention are explained below by reference to the attached drawings.

Figure 1:
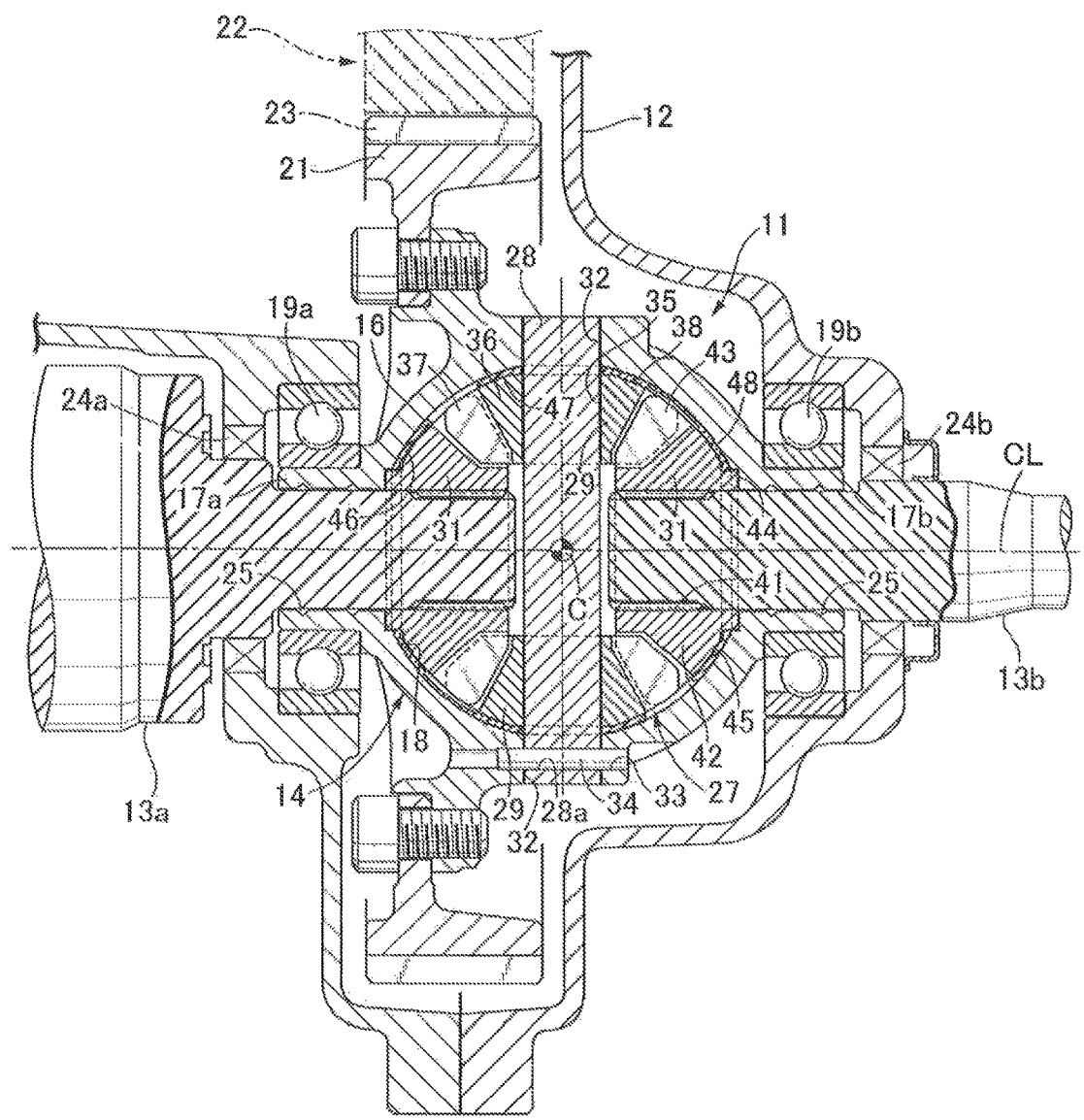
FIG. 1 is a sectional view schematically showing the overall arrangement of a differential device related to one embodiment of the present invention.

FIG. 1 schematically shows the overall arrangement of a differential device 11 related to one embodiment of the present invention. An automobile includes a transmission case 12 that is disposed next to for example an engine (not illustrated) as a power source mounted on the automobile and houses a transmission (not illustrated) and the differential device 11. For example, a pair of left and right output shafts 13a and 13b connected to axles are supported on the transmission case 12 so as to be rotatable around a central axis CL. The two output shafts 13a and 13b are disposed coaxially to each other and each have one end joined to the differential device 11 within the transmission case 12.

The differential device 11 includes for example a differential case 14 supported on the transmission case 12 so as to be rotatable around the central axis CL, and a differential gear mechanism 27 as a differential mechanism housed within the differential case 14. The differential case (input member) 14 includes for example a spherical part 16, a first bearing portion (first boss part) 17a and a second bearing portion (second boss part) 17b formed integrally with the spherical part 16 and projecting in opposite directions from each other on the central axis CL, and a spherical space 18 defined by the spherical part 16 and having a center C on the central axis CL.

Furthermore, the first bearing portion 17a and the second bearing portion 17b are formed into for example a cylindrical shape coaxial with the central axis CL. Moreover, the first bearing portion 17a and the second bearing portion 17b are fitted via their outer peripheral faces in bearings 19a and 19b respectively. The output shafts 13a and 13b are inserted into the first bearing portion 17a and the second bearing portion 17b respectively.

Connected to the differential case 14 is for example a ring gear 21. The ring gear 21 has a large number of gear teeth disposed as for example a ring shape coaxial with the central axis CL. The ring gear 21 meshes with a gear part 23 of a reduction gear mechanism 22. Power of the engine is thereby transmitted from the transmission to the ring gear 21.

Disposed between the transmission case 12 and the output shafts 13a and 13b are for example seal members 24a and 24b having an annular shape. The seal members 24a and 24b provide a liquid-tight seal between the transmission case 12 and the rotating output shafts 13a and 13b. Furthermore, formed in a bottom part of the transmission case 12 is an oil pan (not illustrated) that faces an internal space of the transmission case 12 and stores a predetermined amount of lubricating oil. Lubricating oil stored in the oil pan is scooped up and scattered around by rotation of the differential case 14 or a movable element of the reduction gear mechanism 22 in the internal space of the transmission case 12. In this way, mechanical moving parts present inside and outside the differential case 14 are lubricated with the scattered lubricating oil.

Furthermore, bored in the spherical part 16 is for example a support hole 32 having a cylindrical shape and an axis passing through the center C and orthogonal to the central axis CL. The support hole 32 extends through the spherical part 16 from the inside to the outside. Moreover, formed in the spherical part 16 is a pin hole 33 traversing one end part of the support hole 32 parallel to the central axis CL and extending through the spherical part 16.

Furthermore, for example, a lubrication groove 25 having a helical shape is formed in inner peripheral faces of the first bearing portion 17a and the second bearing portion 17b. Therefore, while the output shafts 13a and 13b are rotating, lubricating oil that makes contact with the output shafts 13a and 13b outside the differential case 14 is guided to the spherical space 18 along the lubrication groove 25.

Moreover, a differential gear mechanism 27 includes, for example, a pinion shaft (shaft) 28, supported on the differential case 14, having an axis passing through the center C while intersecting the central axis CL at right angles, a plurality (two in this embodiment) of pinion gears (differential gears) 29 supported on the pinion shaft 28 so as to be rotatable around the axis of the pinion shaft 28, and a pair of side gears (output gears) 31, supported so as to be rotatable around the central axis CL, meshing with the plurality of pinion gears 29.

Furthermore, both ends of the pinion shaft 28 are each fitted into for example the spherical part 16. That is, the pinion shaft 28 is inserted into the support hole 32. Moreover, formed in the pinion shaft 28 is for example a through hole 28a that has an identical diameter to and is coaxial with the pin hole 33 in a state in which the pinion shaft 28 is fitted into the spherical part 16. A pin 34 is press fitted into the pin hole 33 and the through hole 28a. The pinion shaft 28 is thereby prevented from falling out of the differential case 14.

Each of the pinion gears 29 includes for example a support body 36 having a shaft hole 35 through which the pinion shaft 28 rotatably passes, and a plurality of gear teeth 37 projecting from the support body 36 outward in the radial direction of the support body 36. The gear teeth 37 are arranged for example in a ring shape around the axis of the pinion shaft 28. A slide face 38 is defined on a back face of the support body 36, the slide face 38 extending from the outer edge, in the axial direction, of the shaft hole 35 radially outward and being received by the spherical part 16. The slide face 38 is formed into a symmetrical shape with respect to the axis of the pinion shaft 28 as a reference. In this embodiment, the slide face 38 is formed from for example a partially spherical surface equidistant from the center C.

Furthermore, in this embodiment, the pinion shaft 28 and the pinion gear 29 are separate bodies from each other, but the present invention is not limited thereto. The present invention may have an arrangement in which for example the pinion gear and the pinion shaft are united. Therefore, the pinion gear 29 is supported on the differential case 14 (more specifically, it is supported on the differential case 14 via the pinion shaft 28). Furthermore, the pinion gear 29 can spin with respect to the differential case 14 and can revolve around the center of rotation of the differential case 14.

Each of the side gears 31 includes for example a support body 42 having a shaft hole 41 that receives extremities of the output shafts 13a and 13b, a plurality of gear teeth 43 projecting from the support body 42 outward in the radial direction of the support body 42 and meshing with the gear teeth 37 of the pinion gear 29, and a boss 44 projecting from a back face of the support body 42 while surrounding the shaft hole 41. The output shafts 13a and 13b are spline joined to the corresponding shaft hole 41.

Furthermore, the output shafts 13a and 13b are relatively non-rotatably fitted into the corresponding side gear 31. When the differential device 11 undergoes differential motion, the rotational torque of the side gear 31 is transmitted to the output shafts 13a and 13b via the spline, thus making the side gear 31 and the output shaft 13a and 13b corresponding to the side gear 31 rotate as a unit. The gear teeth 43 are arranged as a ring shape around the central axis CL.

Defined on the back face of the support body 42 is for example a slide face 45 extending from the peripheral edge of the boss 44 outward in the radial direction of the support body 42 and received by the spherical part 16. The slide face 45 is formed into a symmetrical shape with respect to the central axis CL as a reference. In this embodiment, the slide face 45 is formed from for example a partially spherical surface equidistant from the center C.

Formed on an inside face of the spherical part 16 is for example a side gear receiving face (output gear receiving face) 46 receiving the slide face 45 of the side gear 31 around the output shafts 13a and 13b. The side gear receiving face 46 is formed as a symmetrical shape with respect to the central axis CL as a reference. Therefore, the differential case 14 can support a back face of the side gear 31 slidably around the central axis CL. Moreover, the side gear receiving face 46 may be defined by a partially spherical surface having the center C. Furthermore, the shape of the side gear receiving face 46 may correspond to the shape of the slide face 45 of the side gear 31.

Furthermore, formed on the inside face of the spherical part 16 is for example a pinion gear receiving face (differential gear receiving face) 47 receiving the slide face 38 of the pinion gear 29 around the pinion shaft 28. The pinion gear receiving face 47 is formed as a symmetrical shape with respect to the axis of the pinion shaft 28 as a reference. Therefore, the differential case 14 can support a back face of the pinion gear 29 slidably around the axis of the pinion shaft 28. Moreover, the pinion gear receiving face 47 may be defined as a partially spherical surface having the center C. Furthermore, the shape of the pinion gear receiving face 47 may correspond to the shape of the slide face 38 of the pinion gear 29.

For example, one washer 48 is disposed in common between the inside face of the spherical part 16 and the back face of one pinion gear 29 and the back face of one side gear 31. The washer 48 is molded using for example a resin material.

Figure 2:
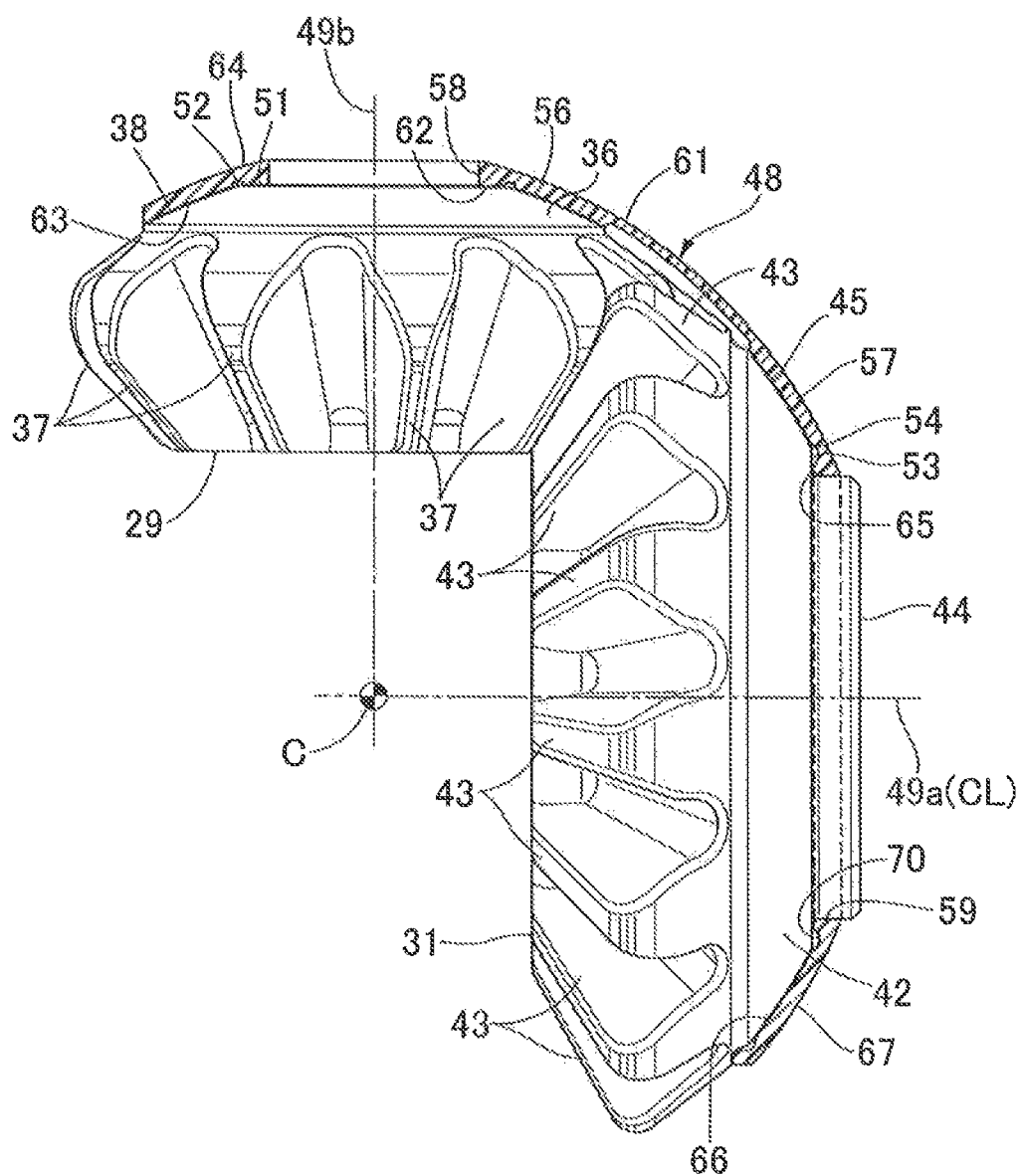
FIG. 2 is an enlarged sectional view showing the relationship of a washer to a pinion gear and a side gear.

As shown in FIG. 2, the pinion gear 29 rotates for example around a second rotational axis 49b (the axis of the pinion shaft 28) intersecting a first rotational axis (central axis CL) 49a of the side gear 31 at right angles at the center C. In this embodiment, the pinion gear 29 and the side gear 31 are formed as bevel gears in which the gear teeth 37 and 43 mesh with each other.

Furthermore, formed on the back face of the pinion gear 29 is a flat area (pinion gear flat area, differential gear flat area) 51 having an annular shape and extending within an imaginary plane orthogonal to the second rotational axis 49b around the pinion shaft 28. The inner periphery of the flat area 51 forms the edge of the shaft hole 35. The outer periphery of the flat area 51 continues to the slide face (pinion gear curved area, differential gear curved area) 38. A ridge line 52 having a circular shape is drawn between the flat area 51 and the slide face 38.

Moreover, formed on the back face of the side gear 31 is a flat area (side gear flat area, output gear flat area) 53 having an annular shape and extending within an imaginary plane orthogonal to the first rotational axis 49a around the boss 44. The inner periphery of the flat area 53 is partitioned by means of the boss 44. The outer periphery of the flat area 53 continues to the slide face (side gear curved area, output gear curved area) 45. A ridge line 54 having a circular shape is drawn between the flat area 53 and the slide face 45.

Referring in addition to FIGS. 3A and 3B, a washer 48 related to the first embodiment includes for example a pinion gear back face part (differential gear back face part) 56 covering the back face of one pinion gear 29, a side gear back face part (output gear back face part) 57 covering the back face of one side gear 31, and a linking part 61 connecting between the side gear back face part 57 and the pinion gear back face part 56.

Furthermore, formed on an inner face of the linking part 61 is a step 73 separating a middle part 71 of the linking part 61 from both end parts 72a and 72b of the linking part 61. Moreover, the step 73 extends from an outer peripheral part of the side gear back face part 57 up to the pinion gear back face part 56. Furthermore, formed on the middle part 71, which is separated by the step 73, is a middle part face (bottom face of recess part) 74. The thickness of the linking part 61 at the middle part face 74 is smaller than the thickness of the linking part 61 at the both end parts 72a and 72b. This allows a guideway 75 to be formed as a recess part by means of the step 73 and the middle part face 74.

In this arrangement, the step 73 forms a side face of the recess part, and the middle part face 74 forms the bottom face of the recess part. Furthermore, the middle part face 74 is formed from for example an inclined face in which the step 73 increases in size in going away from the rotational axis of the side gear 31 (in going from the rotational axis of the side gear 31 toward the pinion gear 29). That is, the step 73 increases in size (increases in depth) in going away from for example the rotational axis of the side gear 31.

Furthermore, the pinion gear back face part 56 makes contact with the back face of the pinion gear 29 via for example an inner face at least partially including a partially spherical surface having a center on the first rotational axis 49a. The pinion gear back face part 56 includes for example a through hole 58 into which the pinion shaft 28 is inserted. Moreover, formed on an inner face of the pinion gear back face part 56 are for example an abutment part 62 abutting against at least the flat area 51 of the pinion gear 29 via a flat face, and a curved part 63 having an annular shape and formed (positioned) on the outer periphery of the abutment part 62.

The abutment part 62 extends in the peripheral direction around the second rotational axis 49b within an imaginary plane orthogonal to the second rotational axis 49b and makes contact with a face with the flat area 51 on the back face of the pinion gear 29. Because of this, when the pinion gear 29 is rotating, the flat area 51 of the pinion gear 29 slips on the abutment part 62.

The curved part 63 continues from for example the outer periphery of the abutment part 62 and is formed from a partially spherical surface equidistant from the center C on the first rotational axis 49a. Furthermore, the curved part 63 extends outward in the radial direction of the pinion gear 29 from the abutment part 62 and curves sideways. Moreover, the curved part 63 makes contact with a face with the slide face 38 on the back face of the pinion gear 29. Because of this, the curved part 63 and the slide face 38 are formed from partially spherical surfaces which are coaxial with each other. Therefore, when the pinion gear 29 is rotating, the slide face 38 of the pinion gear 29 slips on the curved part 63.

Formed on an outer face (the reverse side of the inner face) of the pinion gear back face part 56 is a reverse contact face 64 making contact with a face with the pinion gear receiving face 47. The reverse contact face 64 is formed from a partially spherical surface conforming to the pinion gear receiving face 47. Furthermore, the reverse contact face 64 may extend outward from the edge of the through hole 58.

Figure 4:
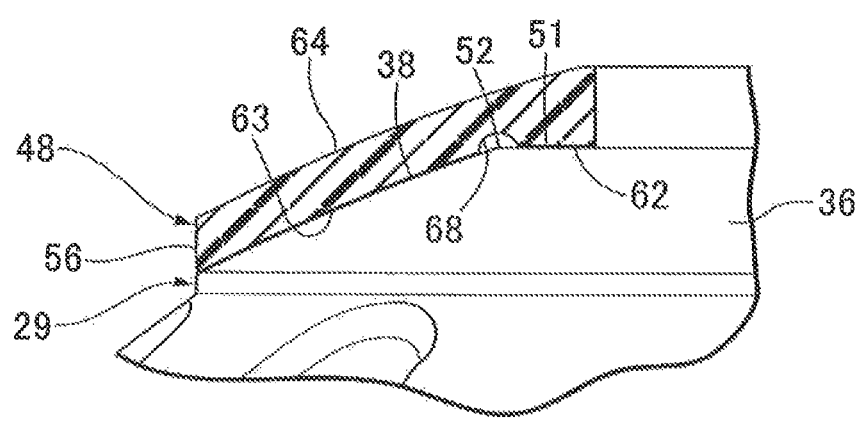
FIG. 4 is an enlarged partial sectional view of the washer.
Figure 5:
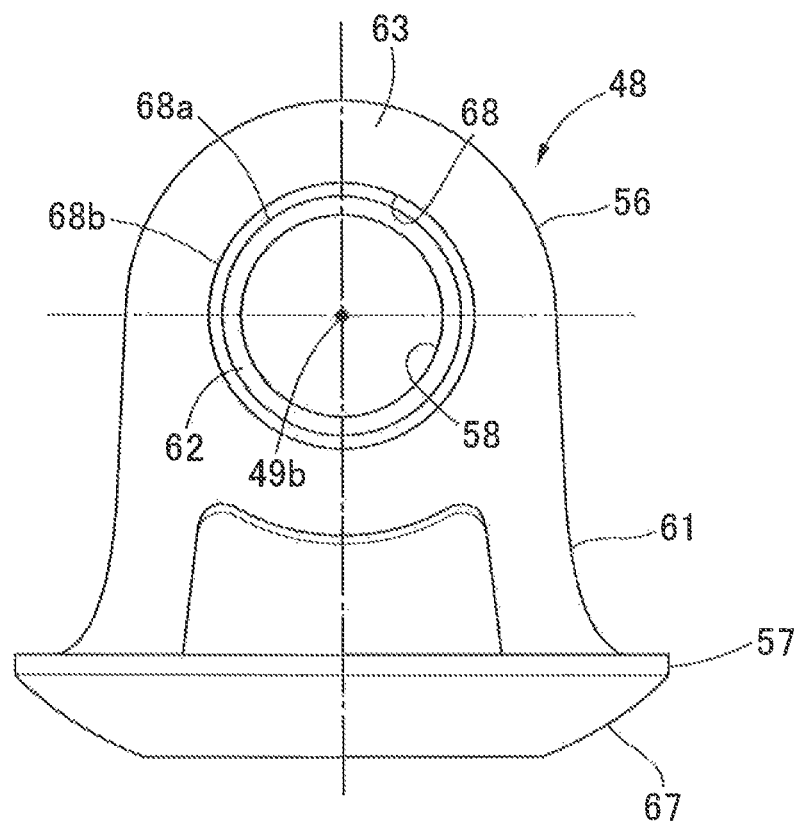
FIG. 5 is an enlarged front view of the washer viewed from arrow 5 in FIG. 3B.

As shown in FIG. 4, on the inner face side of the pinion gear back face part 56, a recess part 68 is for example provided between the abutment part 62 and the curved part 63. That is, the recess part 68 is indented further toward the pinion gear back face part 56 side than the curved part 63 and the abutment part 62 at the edge of the abutment part 62 and an area around the edge of the abutment part 62. Because of this, a void is formed from the recess part 68, the slide face 38, the ridge line 52, and the flat area 51. As shown in FIG. 5, the recess part 68 is continuous in an area around the through hole 58 without interruption so as to correspond to the ridge line 52 having a circular shape. Furthermore, the recess part 68 is partitioned by an inner ridge line 68a having a circular shape and an outer ridge line 68b having a circular shape, which are coaxial with the second rotational axis 49b.

The side gear back face part 57 includes for example a through hole 59 into which the boss 44 of the side gear 31 is inserted. Furthermore, formed on an inner face of the side gear back face part 57 are a flat face (output gear flat part) 65 extending in the peripheral direction around the first rotational axis 49a within an imaginary plane orthogonal to the first rotational axis 49a and making contact with a face with the flat area 53 on the back face of the side gear 31, and a curved face (output gear curved part) 66 having an annular shape and formed (positioned) on the outer periphery of the flat face 65.

Moreover, the curved face 66 continues from the outer periphery of the flat face 65 and is formed from a partially spherical surface equidistant from the center C on the first rotational axis 49a. Furthermore, the curved face 66 extends from the flat face 65 outward in the radial direction of the side gear 31 and curves sideways. The curved face 66 makes contact with a face with the slide face 45 on the back face of the side gear 31. Because of this, when the side gear 31 is rotating, the flat area 53 and the slide face 45 of the side gear 31 slip on the flat face 65 and the curved face 66 respectively.

As shown in FIG. 2, on the inner face side of the side gear back face part 57, a side gear-side recess part (output gear recess part, recess part) 70 is provided for example between the flat face 65 and the curved face 66. That is, the side gear-side recess part 70 is indented further toward the side gear back face part 57 side than the curved face 66 and the flat face 65 in the edge of the flat face 65 and an area around the edge of the flat face 65. Because of this, a void is formed by means of the side gear-side recess part 70, the slide face 45, the ridge line 54, and the flat area 53.

Furthermore, the side gear-side recess part 70 is continuous in an area around the through hole 59 without interruption so as to correspond to the ridge line 54 having a circular shape. The side gear-side recess part 70 is partitioned by an inner ridge line 70a having a circular shape and an outer ridge line 70b having a circular shape, which are coaxial with the first rotational axis 49a. Formed on an outer face (the reverse side of the inner face) of the side gear back face part 57 is a reverse contact face 67 making contact with a face with the side gear receiving face 46. The reverse contact face 67 is formed from a partially spherical surface conforming to the side gear receiving face 46. The reverse contact face 67 may extend outward from the edge of the through hole 59.

The operation of this embodiment is now explained. Power of the engine is transmitted from the reduction gear mechanism 22 to the ring gear 21, thus causing the differential case 14 to rotate around the central axis CL. When the automobile is travelling straight ahead, since no difference in rotational speed between the left and right wheels occurs, the pinion gear 29 revolves around the central axis CL together with the differential case 14 without spinning around the pinion shaft 28. The left and right side gears 31 are rotated at the same speed by revolution of the pinion gear 29. Because of this, the driving force of the side gear 31 is transmitted evenly to the left and right output shafts 13a and 13b.

On the other hand, when the automobile is turning, etc., and a difference in rotational speed between the left and right wheels occurs, the pinion gear 29 revolves while spinning Therefore, a rotational driving force is transmitted from the pinion gear 29 to the left and right side gears 31 while allowing differential rotation thereof. In this process, the slide face 45 of the side gear 31 is slidably received by the inner face of the differential case 14 via the side gear receiving face 46. Furthermore, the slide face 38 of the pinion gear 29 is slidably received by the inner face of the differential case 14 via the pinion gear receiving face 47. The washer 48 contributes to a reduction in the contact resistance between the differential case 14 and the side gear 31 and pinion gear 29.

When the washer 48 is disposed between the differential case 14 and the side gear 31 and pinion gear 29, the side gear back face part 57 covers the back face of the side gear 31, and the pinion gear back face part 56 covers the back face of the pinion gear 29. When the side gear 31 rotates around the central axis CL, rotational power around the central axis CL is generated in the side gear back face part 57 of the washer 48. Since the side gear back face part 57 and the pinion gear back face part 56 are linked by the linking part 61, rotational power around the central axis CL is transmitted from the side gear back face part 57 to the pinion gear back face part 56 via the linking part 61.

However, since the pinion gear back face part 56 and the back face of the pinion gear 29 make contact with surface to each other via the abutment part 62 and the flat area 51, the pinion gear back face part 56 is restricted from rotating in the rotational direction around the central axis CL. Because of this, it is possible to prevent displacement of the pinion gear back face part 56 with respect to the back face of the pinion gear 29.

In accordance with the present embodiment, the washer 48 includes at least the side gear back face part 57 and the pinion gear back face part 56, the side gear back face part 57 covering the back face of the side gear 31 rotating around the first rotational axis 49a and making contact with the back face of the side gear 31 via the inner face formed symmetrically with respect to the axis of the first rotational axis 49a around the first rotational axis 49a, the pinion gear back face part 56 being linked to the side gear back face part 57, covering the back face of the pinion gear 29 rotating around the second rotational axis 49b orthogonal to the first rotational axis 49a and making contact with the back face of the pinion gear 29 via the inner face at least partially including the partially spherical surface having the center C on the first rotational axis 49a. In this arrangement, a flat face, that is the abutment part 62 is formed on the inner face of the pinion gear back face part 56, the flat face extending in the peripheral direction around the second rotational axis 49b and making contact with the flat area 51 of the back face of the pinion gear 29.

This enables position aberration of the pinion gear back face part 56 of the washer 48 caused by rotation of the side gear 31 around the central axis CL to be suppressed. Furthermore, the flat face of the abutment part 62 may be formed from a flat face which has an annular shape and is coaxial with the second rotational axis 49b while intersecting the second rotational axis 49b at right angles.

Furthermore, in accordance with the present embodiment, the curved part 63 and the recess part 68 are formed on the inner face of the pinion gear back face part 56, the curved part 63 curving from the abutment part 62 outward in the radial direction of the pinion gear 29, the recess part 68 being provided between the abutment part 62 and the curved part 63. Forming the recess part 68 between the abutment part 62 and the curved part 63 in this way ensures that there is a gap between the edge (that is, the ridge line 52) of the flat area 51 of the pinion gear 29 and the curved part 63 of the pinion gear back face part 56, thereby avoiding the formation of an edge on the border between the abutment part 62 and the curved part 63. Moreover, it is possible to reliably prevent contact between the washer 48 and the edge of the flat area 51 of the pinion gear 29.

This can contribute to prevention of wear of the washer 48 or seizing of the washer 48. It is also possible to prevent the washer 48 from running onto the border between the abutment part 62 and the curved part 63. Due to the recess part 68 being formed, it is possible to store lubricating oil between the back face of the pinion gear 29 and the pinion gear back face part 56 of the washer 48. This enables the lubricating oil to be efficiently utilized.

Furthermore, in accordance with the present embodiment, the flat face 65, the curved face 66 and the side gear-side recess part 70 are formed on the inner face of the side gear back face part 57, the flat face 65 making contact with a face with the flat area 53 of the side gear 31, the curved face 66 curving in going from the flat face 65 outward in the radial direction of the side gear 31, the side gear-side recess part 70 being provided between the flat face 65 and the curved face 66. Forming the side gear-side recess part 70 between the flat face 65 and the curved face 66 in this way ensures that there is a gap between the edge (that is, the ridge line 54) of the flat face 65 of the side gear 31 and the curved face 66 of the side gear back face part 57. This enables the formation of an edge on the border between the flat face 65 and the curved face 66 to be avoided. Moreover, it is possible to reliably prevent contact between the washer 48 and the edge of the flat face 65 of the side gear 31.

This can contribute to prevention of wear of the washer 48 or seizing of the washer 48. It is also possible to prevent the washer 48 from running onto the border between the flat face 65 and the curved face 66. It is also possible, by forming the side gear-side recess part 70, to store lubricating oil between the back face of the side gear 31 and the side gear back face part 57 of the washer 48. This enables the lubricating oil to be efficiently utilized.

Figure 6:
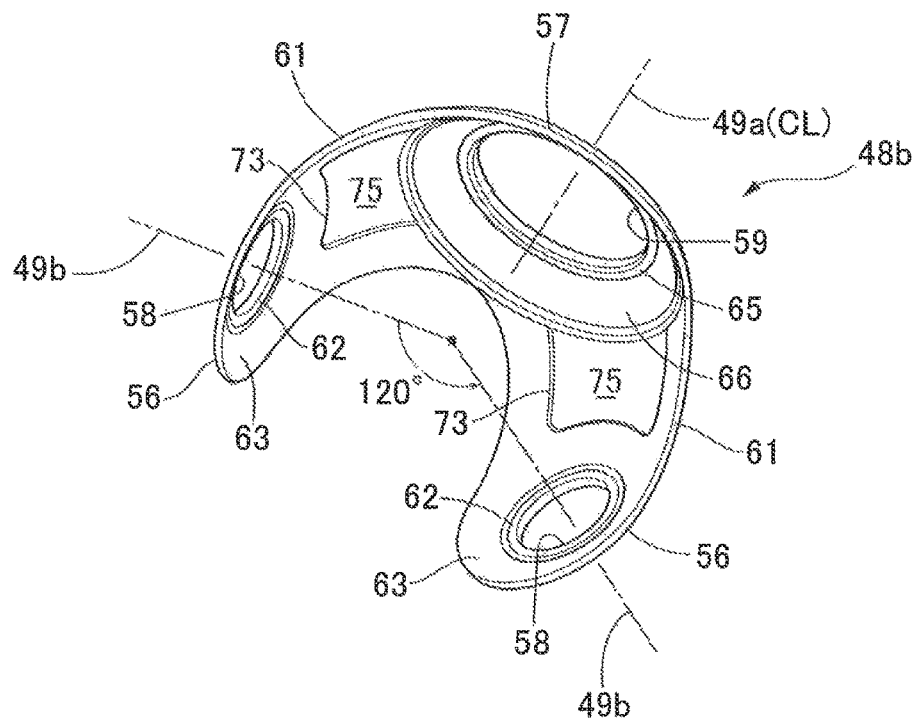
FIG. 6 is an enlarged perspective view of a washer related to a second embodiment.

FIG. 6 schematically shows the arrangement of a washer 48b related to a second embodiment. The washer of the second embodiment is different from that of the first embodiment in terms of having a plurality (two in the second embodiment) of pinion gear back face parts per side gear back face part. The arrangement of the second embodiment is otherwise the same as that of the first embodiment. Because of this, only differences from the first embodiment are explained here, and parts of the arrangement that are the same as those of the first embodiment are to be referred to in the first embodiment and are not explained in detail.

The washer 48b includes a plurality (two in the second embodiment) of pinion gear back face parts 56 per side gear back face part 57. Each of the pinion gear back face parts 56 covers the back face of one pinion gear 29. Each of the pinion gear back face parts 56 is individually connected to the side gear back face part 57 by means of the linking part 61. As described above, the step 73 partitioning the guideway 75 is formed on the inner face of the linking part 61. An opening may be formed in the guideway 75. The plurality (two in the second embodiment) of through holes 58 have axes intersecting each other at a central angle of 120° around the central axis CL.

Furthermore, the effects of the second embodiment are basically the same as those of the first embodiment. Because of this, the effects of the second embodiment are to be referred to in the first embodiment (provided that differences in the arrangement should be understood as necessary with appropriate modifications) and will not be explained in detail. Moreover, such a washer 48b may be applied to a differential gear mechanism in which three pinion gears 29 are disposed around the central axis CL at equal intervals of 120°. In this arrangement, the two pinion gear back face parts 56 of the washer 48b cover the back faces of two pinion gears 29 among the three pinion gears 29, and the back face of the remaining one pinion gear 29 may be covered with the pinion gear back face part 56, described above, of the washer 48.

Figure 7:
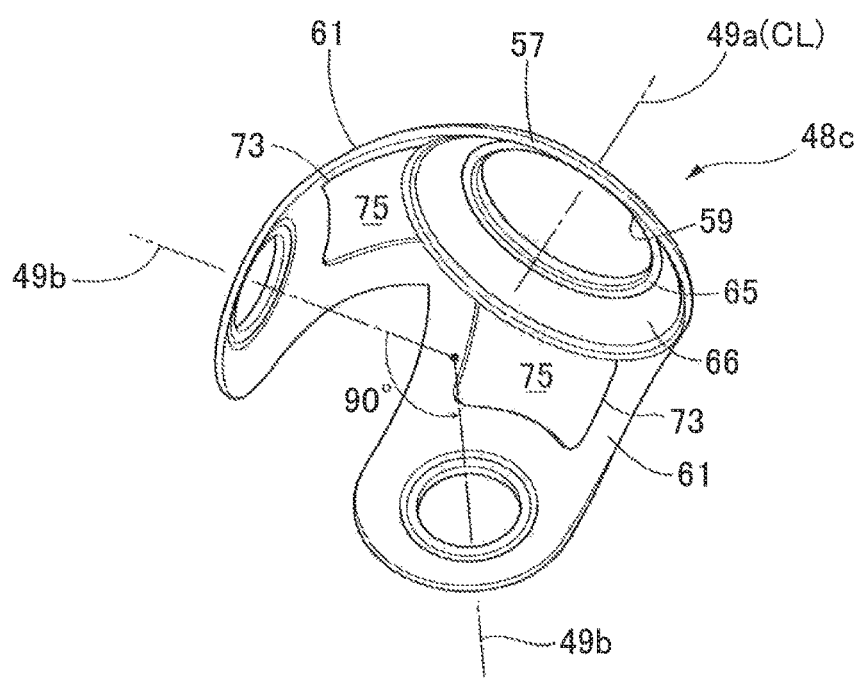
FIG. 7 is an enlarged perspective view of a washer related to a third embodiment.

FIG. 7 schematically shows the arrangement of a washer 48c related to a third embodiment. The washer of the third embodiment is a modified example of the second embodiment. Because of this, in the third embodiment, differences from the second embodiment are explained; a detailed explanation is to be referred to in the second embodiment and is omitted here.

The washer 48c has a plurality (two in the third embodiment) of pinion gear back face parts 56 per side gear back face part 57. Furthermore, the plurality (two in the third embodiment) of through holes 58 have axes intersecting each other at a central angle of 90° around the central axis CL.

Furthermore, as for the second embodiment, the effects of the third embodiment are basically the same as the effects of the first embodiment. Because of this, the effects of the third embodiment are to be referred to in the first embodiment (provided that differences in the arrangement should be understood as necessary with appropriate modifications) and will not be explained in detail. Such a washer 48c may be applied to a differential gear mechanism in which four pinion gears 29 are disposed around the central axis CL at equal intervals of 90°.

Moreover, the present invention may be applied not only to a washer having one pinion gear back face part per side gear back face part as in the first embodiment, but also to a washer having a plurality of pinion gear back face parts per side gear back face part as in the second and third embodiments. Furthermore, in this arrangement, depending on the embodiment, the number of pinion gear back face parts and the number of linking parts may be set appropriately according to the number of pinion gears, such as three or four instead of two as for the number of pinion gear back face parts in the second and third embodiments.

Moreover, in the above embodiments, a differential device equipped with a washer is illustrated, but the present invention is not limited thereto. The present invention may be applied to for example a transmission device equipped with a washer.

Furthermore, in the above embodiments, the washer is molded using a resin material, but the present invention is not limited thereto. In the present invention, as a material for molding the washer, for example, a composite material in which a reinforcing material is mixed with a metal or resin material may be employed. Examples of the reinforcing material include metal, glass fiber, carbon fiber, aramid fiber, and boron fiber.

What is claimed is:

1. A washer for a differential gear mechanism, said differential gear mechanism comprising a pair of output gears and a differential gear,
    said washer comprising
    at least one differential gear back face part covering a back face of the differential gear,
    an output gear back face part covering a back face of one of the output gears, and
    at least one linking part connecting between the output gear back face part and the differential gear back face part,
    the differential gear back face part being connected to the output gear back face part via the linking part at only one of opposite ends of the differential gear back face part in a direction of a rotation axis of the output gears,
    an abutment part and a curved part being formed on an inner face of the differential gear back face part, the abutment part abutting against a flat area on the back face of the differential gear via a flat face while the curved part abutting against a spherical area on the back face of the differential gear via a curved face.

2. The washer according to claim 1, wherein
    the curved part curves in going in a radially outward direction of the differential gear from the abutment part, and
    a recess part is provided between the abutment part and the curved part.

3. The washer according to claim 1, wherein
    formed on an inner face of the output gear back face part are
    an output gear flat part abutting against the back face of the output gear via a face,
    an output gear curved part curving in going in a radially outward direction of the output gear from the output gear flat part, and
    an output gear recess part provided between the output gear flat part and the output gear curved part.

4. The washer according to claim 2, wherein
    formed on an inner face of the output gear back face part are
    an output gear flat part abutting against the back face of the output gear via a face, an output gear curved part curving in going in a radially outward direction of the output gear from the output gear flat part, and an output gear recess part provided between the output gear flat part and the output gear curved part.

5. A differential device comprising an input member, the differential gear mechanism having a plurality of differential gears including a differential gear flat area and a differential gear curved area on a back face side, the differential gears being housed within the input member, the differential gear curved area extending over an outer periphery of the differential gear flat area, and the pair of output gears including an output gear flat area and an output gear curved area on a back face side, the output gears being housed within the input member and meshing with the plurality of differential gears, the output gear curved area extending over an outer periphery of the output gear flat area, and a plurality of the washers according to claim 1 housed within the input member.

6. A differential device comprising an input member, the differential gear mechanism having a plurality of differential gears including a differential gear flat area and a differential gear curved area on a back face side, the differential gears being housed within the input member, the differential gear curved area extending over an outer periphery of the differential gear flat area, and the pair of output gears including an output gear flat area and an output gear curved area on a back face side, the output gears being housed within the input member and meshing with the plurality of differential gears, the output gear curved area extending over an outer periphery of the output gear flat area, and a plurality of the washers according to claim 2 housed within the input member.

7. A differential device comprising an input member, the differential gear mechanism having a plurality of differential gears including a differential gear flat area and a differential gear curved area on a back face side, the differential gears being housed within the input member, the differential gear curved area extending over an outer periphery of the differential gear flat area, and the pair of output gears including an output gear flat area and an output gear curved area on a back face side, the output gears being housed within the input member and meshing with the plurality of differential gears, the output gear curved area extending over an outer periphery of the output gear flat area, and a plurality of the washers according to claim 3 housed within the input member.

8. A differential device comprising an input member, the differential gear mechanism having a plurality of differential gears including a differential gear flat area and a differential gear curved area on a back face side, the differential gears being housed within the input member, the differential gear curved area extending over an outer periphery of the differential gear flat area, and the pair of output gears including an output gear flat area and an output gear curved area on a back face side, the output gears being housed within the input member and meshing with the plurality of differential gears, the output gear curved area extending over an outer periphery of the output gear flat area, and a plurality of the washers according to claim 4 housed within the input member.

\* \* \* \* \*